Figure 1:
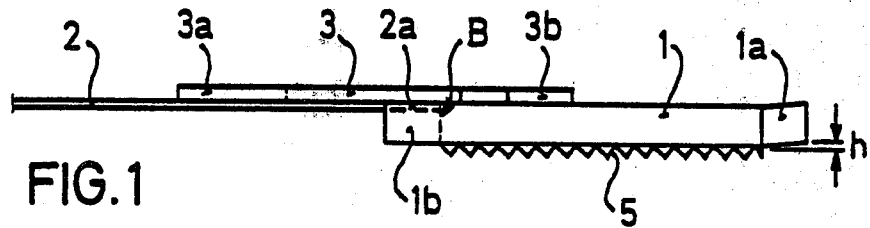

United States Patent [19]

Schoettle et al.

[11] 4,333,619
[45] Jun. 8, 1982

[54] RECORDING MEDIUM AND LEADER ASSEMBLY

[75] Inventors: Klaus Schoettle, Heidelberg; Lothar Gliniorz, Frankenthal, both of Fed. Rep. of Germany

[73] Assignee: BASF Aktiengesellschaft, Ludwigshafen, Fed. Rep. of Germany

[21] Appl. No.: 143,487

[22] Filed: Apr. 24, 1980

[30] Foreign Application Priority Data

May 2, 1979 [DE] Fed. Rep. of Germany ....... 2917709

[51] Int. Cl.³ .......................... G03B 1/04; G03C 1/76
[52] U.S. Cl. ................................... 242/195
[58] Field of Search ...................... 242/179, 195, 197; 206/389, 400; 352/235; 428/343, 346–349, 57, 77, 200, 900, 906

[56] References Cited

U.S. PATENT DOCUMENTS

| | | |
|---|---|---|
| 2,724,436 | 11/1955 | Constantine . |
| 3,423,038 | 1/1969 | Katzef et al. ............... 352/235 X |
| 3,694,294 | 9/1972 | Cafiero . |
| 3,741,497 | 6/1973 | Ganske . |
| 3,773,276 | 11/1973 | Ganske . |
| 3,809,218 | 5/1974 | Furst . |
| 3,823,947 | 7/1974 | Sasaki et al. . |
| 3,827,699 | 8/1974 | Waugh . |
| 3,836,094 | 9/1974 | Hollingsworth . |
| 3,955,777 | 5/1976 | Burdorf . |
| 4,042,189 | 8/1977 | Lewis ................................. 242/195 |
| 4,091,168 | 5/1978 | Kawamata . |

FOREIGN PATENT DOCUMENTS 1244539 9/1971 United Kingdom .
1311225 3/1973 United Kingdom .

*Primary Examiner*—Leonard D. Christian
*Attorney, Agent, or Firm*—Keil & Witherspoon

[57] ABSTRACT

A strip-like recording medium, in particular a magnetic tape, is provided with at least one self-threading leader which wraps smoothly onto the periphery of a cylindrical body, the recording medium and the leader being joined to one another, over their butt joint, by a piece of splicing tape. The leader and the piece of splicing tape have a predetermined length which approximately corresponds to the circumference of the cylindrical body. A reel comprises a hub and a roll of recording medium with a leader at the beginning and/or end of the medium, the leader being attached to the medium by a piece of splicing tape of said predetermined length.

12 Claims, 5 Drawing Figures

RECORDING MEDIUM AND LEADER ASSEMBLY

The present invention relates to a strip-like recording medium (hereinafter referred to as "recording tape"), in particular a magnetic tape, having at least one self-threading leader and adapted to form a supply or take-up roll, the leader, which is joined to the recording tape by adhesive means, wrapping smoothly onto the periphery of a substantially cylindrical hub to begin winding the tape thereon or engaging the periphery of the fully wound roll of tape to maintain the roll's integrity, and further relates to a tape reel having such a leader.

Strip-like recording media such as magnetic tapes and films can be threaded manually or automatically on transport apparatus in such a way that the recording medium is protected.

It has been disclosed that a flexible leader provided with toothed flanges may be used, the teeth of which grip the rim of the hub and thus provide a firm engagement for the leader so that it can begin winding on the hub (U.S. Pat. No. 3,773,276 and British Pat. No. 1,244,539). This known leader employs the toothed flanges to also engage the side edges of the outermost convolutions of tape of the tape roll in a manner to retain these convolutions in their coiled positions. For this purpose, the leader is of a length which corresponds to the circumference of the fully wound tape reel, the leading end of the leader being provided with a pointed tip and the trailing end with a complementary recess so as to obtain a substantially smooth periphery, so that unintentional unrolling of the tape reel outside the tape transport is avoided.

The recording medium and the leader are adhered to one another, for example with the substantially thinner recording medium located in a recess in the thicker leader tape, so that a flat rear surface is obtained. In the case of very thin tapes, such a recess cannot be produced with sufficient accuracy.

According to British Pat. No. 1,311,225 it is also possible to join the overlapping ends of a magnetic tape and of the leader by ultrasonic welding. The formation of ribs in the ends which have been welded in this way is a disadvantage, the height of the ribs being of the order of the thickness of the magnetic tape.

To avoid the formation of a non-circular tape roll, it has also been proposed (German Laid-Open Application DOS 2,302,777) to appropriately taper the tip of the leader over a length corresponding to the circumference of the hub, but this results in a reel which does not have a smooth periphery.

It is an object of the present invention to provide a recording tape with a leader which are joined together in an optimum manner, non-circularity of the reel to be formed, or the reel which has been formed, being substantially avoided.

This object is achieved, according to the invention, in a simple manner with a recording tape, in particular a magnetic tape, having at least one self-threading leader and adapted to form a supply or take-up roll, the leader, which is joined to the recording tape by adhesive means, wrapping smoothly onto the periphery of a substantially cylindrical hub to begin winding the tape thereon or engaging the periphery of the fully wound roll of tape to maintain the roll's integrity, if the leader and the recording tape abut at their ends so that their respective backs form a flat surface, and the butt joint is covered with a piece of splicing tape.

It is possible to use commercial splicing tape, so that the joint can be made simply and economically.

Advantageously, about half of the piece of splicing tape is stuck to the recording tape whilst the other half is stuck to the leader.

It is furthermore advantageous if the length of the piece of splicing tape approximately corresponds to the length of the leader. In a further embodiment, the length of the leader approximately corresponds to the circumference of the hub or to the circumference of the fully wound reel.

In an advantageous embodiment of a tape reel, the recording tape has a leader at both ends, each leader being fixed to the recording tape by a piece of splicing tape, the length of which corresponds approximately to the circumference of the hub.

It is also advantageous if the ends of the piece of splicing tape are cut at an acute angle ($\alpha$), especially 45°, to the edge of the piece of tape, or one end is provided with a pointed tip and the other end with a matching recess, like the leader. It is, furthermore, advantageous if the adhesive coating on the piece of splicing tape is resilient and is, in particular, thermoplastic.

To subject the recording tape, in particular a thin magnetic tape, to minimum stress, it is also important that the length of the piece of splicing tape should be shorter, by an amount corresponding to about 2-3 thicknesses of the recording tape, than the circumference of the hub with the leader wrapped around it.

Figure 2:
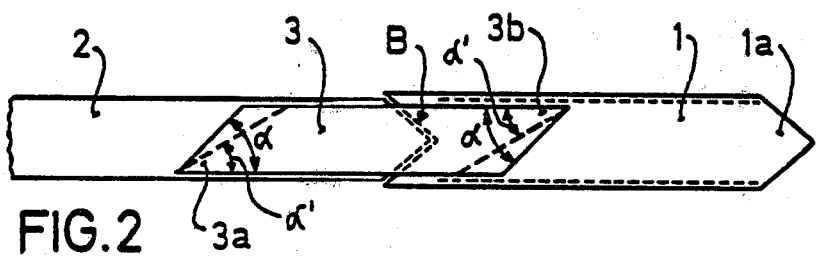
Figure 3:
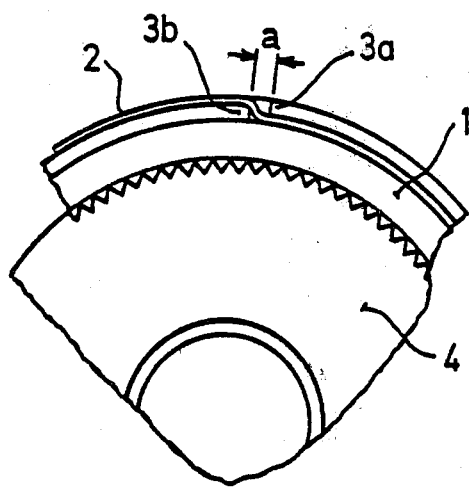
Figure 4:
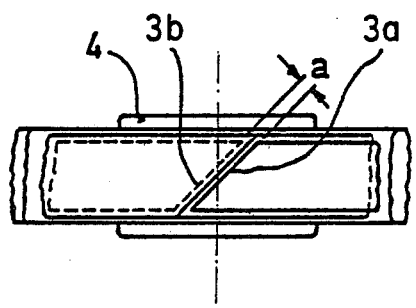
Figure 5:
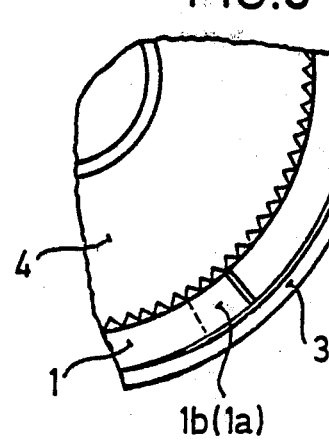

Further details of the invention are disclosed in the following description of an embodiment shown in the accompanying drawing, in which FIG. 1 shows a recording tape/leader joint according to the invention, in side view, FIG. 2 shows the joint of FIG. 1, in plan view, FIG. 3 is a view which shows a portion of the periphery of a hub, with the leader and a piece of splicing tape according to the invention, FIG. 4 shows the same portion of the periphery as in FIG. 3, but in front elevation, and FIG. 5 is a view which shows the butt joint of the leader on a portion of the periphery of a hub, and part of the piece of splicing tape.

The end 2a of a recording tape 2, for example a magnetic tape less than 10 $\mu$m (micrometers) thick, has a pointed tip which fits in a complementary recess 1b of a leader 1 of substantially greater thickness. The leader 1 is provided with toothed flanges 5 for gripping a hub 4, of which a portion is shown in FIGS. 3 and 5. The hub 4 can be considered to also represent a fully wound reel. If the leader 1 does not possess toothed flanges, it can be attached to the hub by other methods, for example by adhesion, cohesion, static charges, magnetic forces and the like. A piece of splicing tape 3 is stuck over the butt joint B of the tape 2 and leader 1, on their rear surfaces, which lie in one plane. As shown, the piece of splicing tape 3 can have tapering ends 3a and 3b, the acute angles being of the same size, e.g. 45° (angle $\alpha$), or have a pointed tip at one end and a complementary recess at the other, corresponding to the leader ends 1a and 1b. A further acute angle $\alpha'$ is shown in broken lines.

The piece of splicing tape 3 may be of a commercial type; advantageously, it is narrower than the tape 2 and the leader 1 and is provided with a permanently resilient adhesive layer, in particular a thermoplastic adhesive layer. The splicing tape 3 is substantially thinner than the leader 1 but substantially thicker than the tape 2. FIG. 3 shows why the length of the piece of splicing tape 3 is advantageously less by an amount a, equal to 2 to 3 thicknesses of the tape 2, than the circumference of the hub 4: this ensures that the tape 2 is not pinched or damaged in some other way.

As may be seen in FIG. 1, the tip of the leader 1 is bent slightly upwards (by an amount h), so that the leader can be automatically peeled off the roll in the transport apparatus. When the leader 1 is wound onto the hub, the said pointed tip 1a fits snugly in the complementary recess 1b in the end of the leader, but a slight hump, corresponding to the height h, is formed on the periphery of the hub. However, as shown in FIG. 3, this hump is spread over a relatively large portion of the periphery, and thus evened out, by the piece of splicing tape 3.

The ends of the leader 1 and of the piece of splicing tape 3, which cooperate in each case, technically serve the purpose of keeping the unevenness on the periphery of the hub to a minimum, since, with thin magnetic tapes, any such unevenness multiplies through numerous layers of tape and can lead to recording/playback errors in video equipment.

In the embodiment according to the invention, the risk of the tape 2 snapping at the place of transition in FIG. 3 is also greatly reduced since the tape easily bridges the gap a, and the difference in thickness between the tape 2 and the adhesive tape 3 is not nearly as great as that between the tape 2 and the leader 1.

A resilient layer of adhesive on the piece of tape 3 serves as a resilient support for the layers of tape wound thereover. As can be seen in FIG. 4, the shearing stresses which are produced in the tape roll along the inclined edges 3a and 3b because of the tape tension employed in winding the tape 2 on the hub are reduced by the resilience of the adhesive layer. It is furthermore advantageous if the backing of the splicing tape is also a thermoplastic.

The magnetic tape/leader joints according to the invention have been tested and produced no adverse time base errors in video recording using tape transport apparatus having a central capstan. It will be clear to the skilled worker that the invention is susceptible of modifications in respect of, for example, the choice of material or the shape of the pieces of tape, without departing from the spirit or scope of the invention, and it is therefore intended that all such modifications should also fall within the scope of the claims.

We claim:

1. A recording tape, in particular a magnetic tape, having at least one self-threading leader and adapted to form a supply or take-up roll, the leader having adhesive means which join the leader to the recording tape and wrapping smoothly onto the circumference of a substantially cylindrical hub to begin winding the tape thereon or engaging the periphery of the fully wound roll of tape to maintain the roll's integrity, the leader and the recording tape abutting at their ends in a butt-joint so that their backs form a flat surface, and the there being provided a piece of splicing tape, said piece of splicing tape covering said butt-joint and having a length approximately corresponding to the length of the leader.

2. A recording tape as claimed in claim 1, wherein the length of the piece of splicing tape as well as the length of the leader approximately correspond to the circumference of the hub.

3. A recording tape as claimed in claim 1 or 2, wherein the length of the piece of splicing tape is shorter, by an amount corresponding to about two to three thicknesses of the recording tape, than the circumference of the hub with the leader wrapped around it.

4. A recording tape as claimed in claim 1, wherein about half the piece of splicing tape is stuck to the recording tape while the other half is stuck to the leader.

5. A recording tape as claimed in claim 1, wherein the length of at least one leader approximately corresponds to the periphery of the fully wound tape roll.

6. A recording tape as claimed in claim 2 or 5, wherein the leader has a central recess at the butt-joint end and, at its free end a tip shaped to fit into said recess.

7. A recording tape as claimed in claim 6, wherein the ends of the piece of splicing tape are cut at an acute angle to the edge of the piece.

8. A recording tape as claimed in claim 6, wherein one end of the piece of splicing tape has a pointed tip and the other end has a complementary recess for receiving said tip.

9. A recording tape as claimed in claim 1, wherein the piece of splicing tape has a resilient adhesive coating, in particular a thermoplastic adhesive coating.

10. A tape reel comprising a recording tape wound on a substantially cylindrical hub, in particular a magnetic tape reel, a leader being provided at the beginning of the recording tape, and there being also provided a piece of splicing tape, said leader being attached to the beginning of the recording tape with the aid of said piece of splicing tape, the length of said piece of splicing tape approximately corresponding to the circumference of the hub.

11. A tape reel comprising a recording tape wound on a substantially cylindrical hub, in particular a magnetic tape reel, a leader being provided at the beginning and at the end of the recording tape, there being also provided two pieces of splicing tape, each leader being attached to said beginning and to said end with the aid of said two pieces of splicing tape, respectively, the length of each said piece approximately corresponding to the circumference of the hub.

12. A tape reel as claimed in claim 10 or 11, wherein each leader has a length which also approximately corresponds to the circumference of the hub.

* * * * *